United States Patent
Aragona

[11] Patent Number: 5,540,010
[45] Date of Patent: Jul. 30, 1996

[54] FISHING ROD JIGGING APPARATUS

[76] Inventor: James T. Aragona, 52551 Brentwood, Shelby Twp., Macomb Co., Mich. 48316

[21] Appl. No.: 310,483

[22] Filed: Sep. 22, 1994

[51] Int. Cl.⁶ ............................................. A01K 97/10
[52] U.S. Cl. ................................ 43/19.2; 43/26.1
[58] Field of Search .......................... 43/19.2, 26.1

[56] References Cited

U.S. PATENT DOCUMENTS

| | | | |
|---|---|---|---|
| 2,758,407 | 8/1956 | Speidell | 43/19.2 |
| 3,623,259 | 11/1971 | Rode | 43/19.2 |
| 3,975,854 | 9/1976 | Graham | 43/19.2 |
| 4,100,695 | 7/1978 | Blanchard . | |
| 4,597,215 | 7/1986 | Otremba | 43/19.2 |
| 4,660,317 | 4/1987 | Evans | 43/19.2 |
| 4,779,371 | 10/1988 | Braud | 43/19.2 |
| 4,916,847 | 4/1990 | Rusgo | 43/19.2 |
| 4,932,151 | 6/1990 | Cicha | 43/26.1 |
| 4,951,411 | 8/1990 | Ecker | 43/19.2 |
| 5,056,255 | 10/1991 | Campbell . | |
| 5,084,995 | 2/1992 | Beaudoin . | |
| 5,119,580 | 6/1992 | Schulte et al. . | |

Primary Examiner—Kurt Rowan

[57] ABSTRACT

A fishing rod jigging apparatus includes a base assembly which has a longitudinal axis. An oscillating driving assembly is supported on the base assembly at a first position along the longitudinal axis. A hinge assembly is supported on the base assembly at a second position along the longitudinal axis. The hinge assembly is spaced apart by a predetermined distance from the oscillating driving assembly. A handle-holder assembly is connected to the hinge assembly. The handle-holder assembly is adapted for rotational motion around the hinge assembly limited in a bottom direction by the base assembly. A linkage assembly is connected between the oscillating driving assembly and the handle-holder assembly for imparting an oscillating motion to the handle-holder assembly. The oscillating driving assembly includes a drive shaft and a drive wheel assembly connected to the drive shaft. The drive wheel assembly includes a center-driven wheel connected to the drive shaft and an eccentric drive element located off-center on the center-driven wheel. The link is pivotally connected at a first end to the eccentric drive element, and a link receiver is connected to the handle-holder assembly. The link is also pivotally connected to the link receiver. The handle-holder assembly includes a canted end adapted to permit the handle-holder assembly to be oriented at a canted angle with respect to the base assembly. The handle-holder assembly includes a hollow cylindrical chamber adapted to receive a handle of a fishing rod.

2 Claims, 3 Drawing Sheets

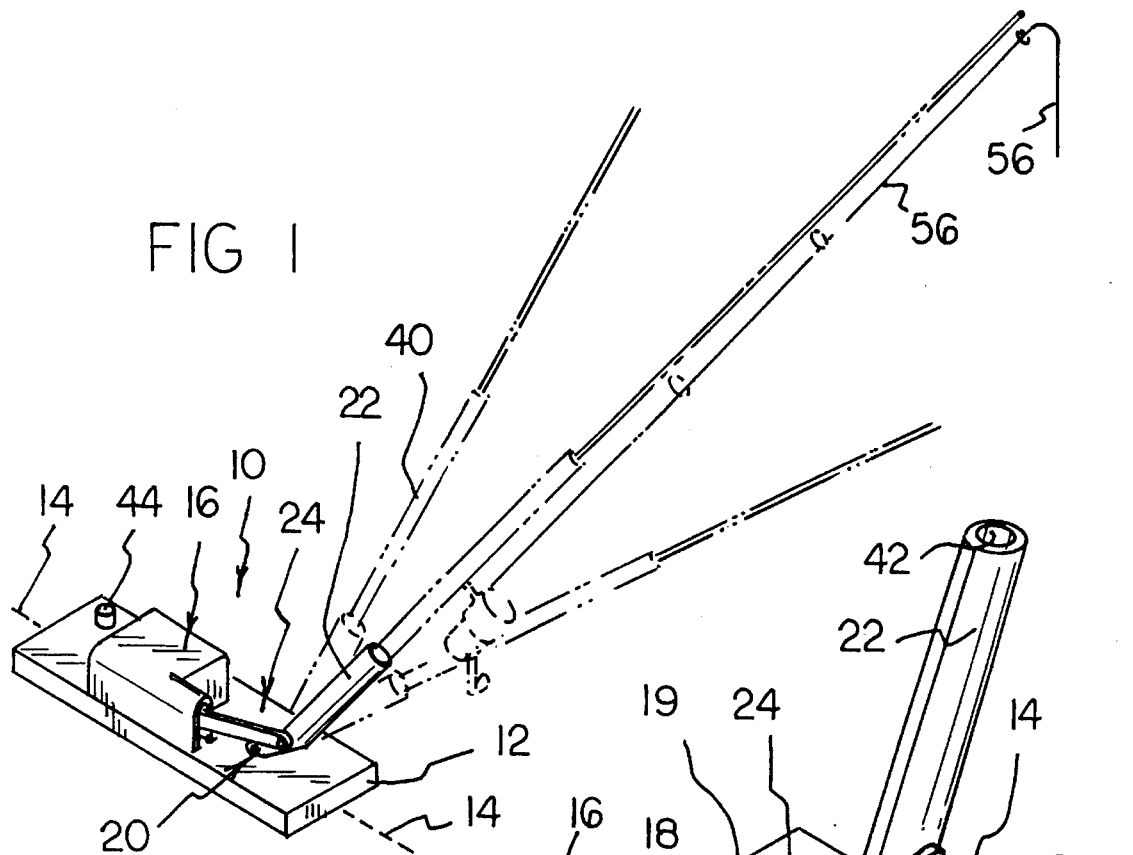
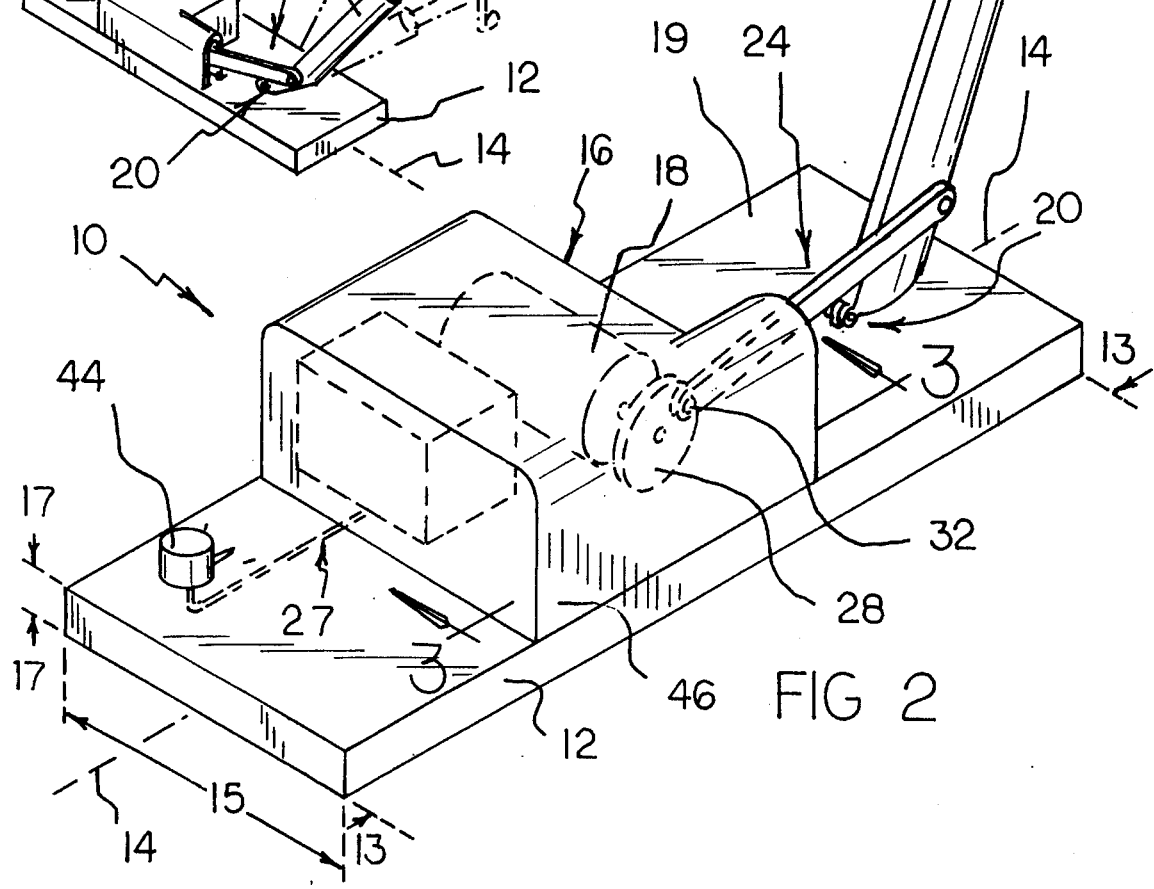

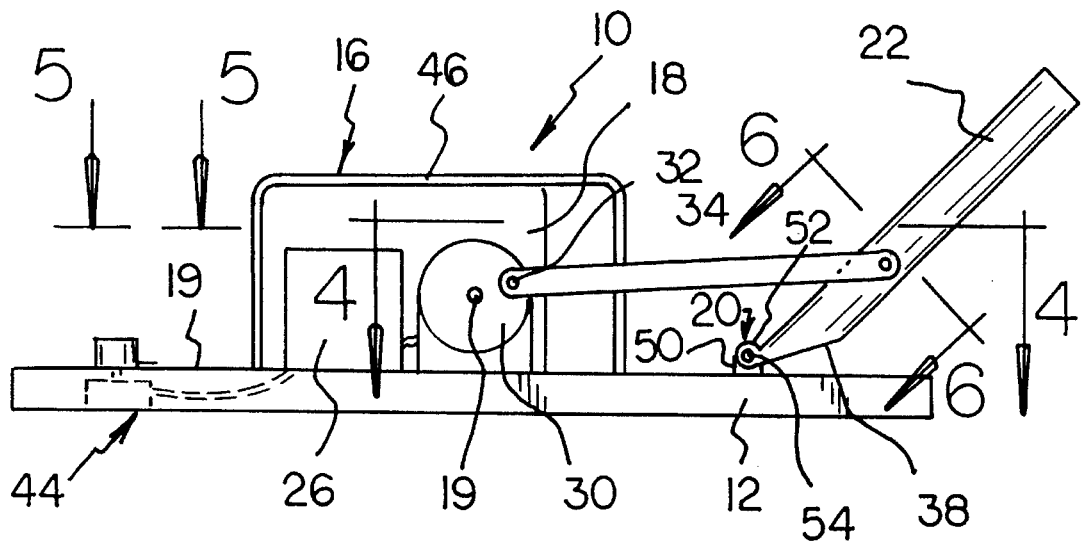
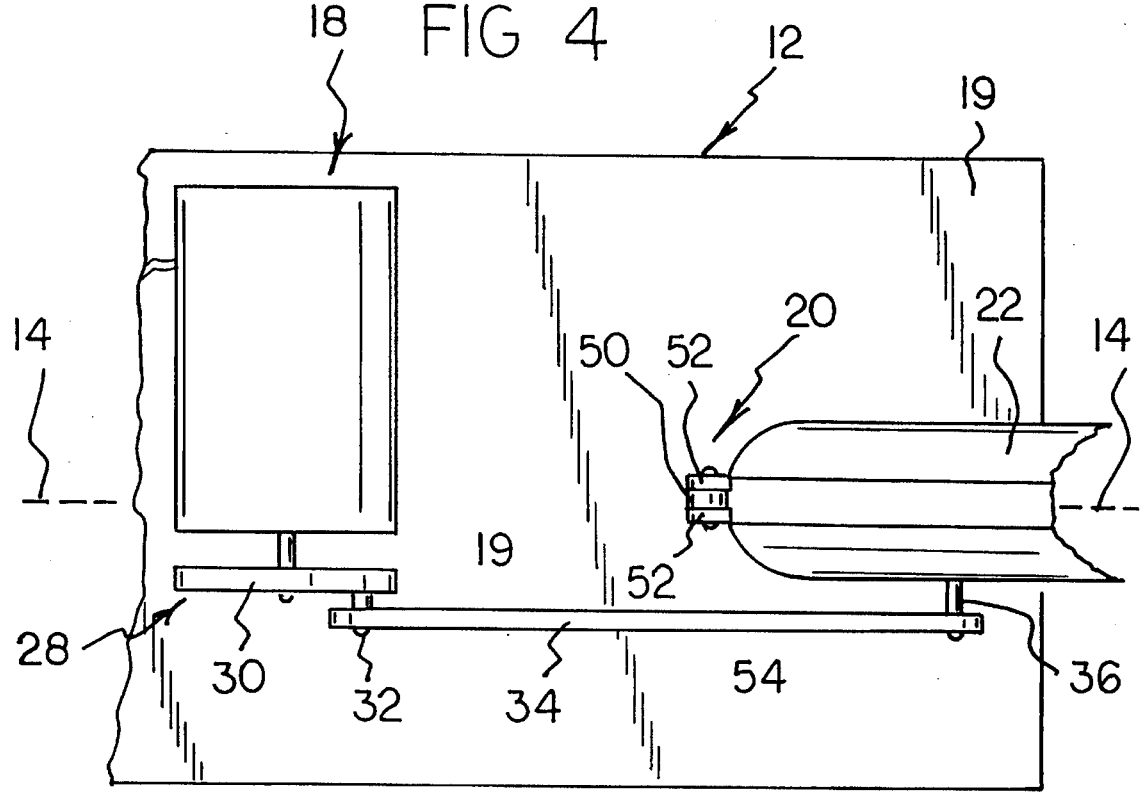

FISHING ROD JIGGING APPARATUS

BACKGROUND OF THE INVENTION

1. Field of the Invention

The present invention relates generally to devices for aiding a fisherman and, more particularly, to devices especially adapted for jigging a fishing line.

2. Description of the Prior Art

In the art of fishing, jigging a fishing line is often desirable. Jigging involves imparting short up and down motions on the fishing line. Throughout the years, a number of innovations have been developed relating to mechanized devices for jigging a fishing line, and the following U.S. patents are representative of some of those innovations: 4,100,695; 4,951,411; 5,056,255; 5,084,995; and 5,119,580. More specifically, U.S. Pat. No. 4,100,695 discloses a fishing rod jigging apparatus that includes the major components arranged in a vertical array. As a result, the device has a relatively high center of gravity and, therefore, is undesirably susceptible to forces tending to tip the device over. In this respect, it would be desirable if a fishing rod jigging apparatus were provided which has a relatively low center of gravity.

U.S. Pat. No. 4,951,411 discloses an electrically operated fishing jigger which does not use a conventional fishing rod and reel. A fishing line is jiggered by a modified reel, and a pole portion is controlled by a spring. A disadvantage of this device is that it does not use a conventional rod and reel. As a result, once a fish bites, the device cannot then be used as a conventional rod and reel would be used to reel in a fish. In this respect, it would be desirable if a fishing line jigging apparatus were provided which permits use of a conventional rod and reel.

U.S. Pat. No. 5,056,255 discloses a fishing rod jigging apparatus which supports a conventional rod and reel on top of a housing which includes a motor and battery. By having the conventional rod and reel supported above the housing, the device has a relatively large center of gravity with its attendant problems. Moreover, this device also includes complex electronic circuitry for selecting different jigging rates. In this respect, it would be desirable if a fishing rod jigging apparatus were provided which does not include complex electronic circuitry.

U.S. Pat. No. 5,084,995 discloses a fishing jigging apparatus which fixes a conventional fishing rod and reel in a base and includes a spring connection from a motor to a free end of the distal end of the rod. Springs have a tendency to fatigue with time and lose their original coefficient of elasticity. In this respect, it would be desirable if a fishing jigging apparatus were provided which does not include springs for providing a jigging motion.

U.S. Pat. No. 5,119,580 discloses a fishing rod jigging apparatus in which a holder for a conventional fishing rod and reel is located at the very top of the apparatus, thereby providing a relatively high center of gravity. In addition, this device employs a spring for providing a jigging motion to the fishing rod. Moreover, this device employs a rotating array of cams to provide the jigging motion. The cams operate by frictional contact, and, as a result, are subject to frictional heat build-up and frictional wear and tear. In this respect, it would be desirable if a fishing rod jigging apparatus were provided which does not include cams for imparting a jigging motion.

Still other features would be desirable in a fishing rod jigging apparatus. For example, it would be desirable if the major components of a fishing rod jigging apparatus were arrayed on a base so that a relatively low center of gravity is obtained. It would also be desirable for a fishing rod jigging apparatus to permit a conventional fishing rod and reel to be readily removed from and placed in the apparatus.

When a fisherman is engaged in ice fishing, it is often uncomfortable for the fisherman to sit for long periods of time and manually impart a jigging motion to the fishing line. In this respect, it would be desirable for a fishing rod jigging apparatus to be provided to enable an ice fisherman to get up and move around or partake of a food or beverage which a mechanical jigging action was underway. Alternatively, when a fishing rod jigging apparatus is in use, a fisherman can manually engage in another type of fishing with another fishing rod and reel. Therefore, the fisherman would be able to engage in two types of fishing at the same time.

Thus, while the foregoing body of prior art indicates it to be well known to use a fishing rod jigging apparatus, the prior art described above does not teach or suggest a fishing rod jigging apparatus which has the following combination of desirable features: (1) has a relatively low center of gravity; (2) permits the use of a conventional fishing rod and reel; (3) does not include complex electronic circuitry; (4) does not include springs for providing a jigging motion; (5) does not include cams for imparting a jigging motion; (6) arrays major components of a fishing rod jigging apparatus on a base in such a way that a relatively low center of gravity is obtained; and (7) permits a conventional fishing rod and reel to be readily removed from and placed in the apparatus. The foregoing desired characteristics are provided by the unique fishing rod jigging apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a fishing rod jigging apparatus which includes a base assembly which has a longitudinal axis and has a length, a width, and a height, wherein each of the length and the width is substantially larger than said height, such that the base assembly is adapted to be stably oriented on a horizontal surface. An oscillating driving assembly is supported a top surface of the base assembly at a first position along the longitudinal axis. A hinge assembly is supported on the top surface of the base assembly at a second position along the longitudinal axis. The hinge assembly is spaced apart by a predetermined distance from the oscillating driving assembly. A handle-holder assembly is connected to the hinge assembly. The handle-holder assembly is adapted for rotational motion around the hinge assembly limited in a bottom direction by the base assembly. A linkage assembly is connected between the oscillating driving assembly and the handle-holder assembly for imparting an oscillating motion to the handle-holder assembly.

The oscillating driving assembly includes a battery supported by the base assembly at the first position along the longitudinal axis. A motor assembly is electrically connected to the battery and supported on the base assembly at a third position along the longitudinal axis between the first and second positions along the longitudinal axis. The motor assembly includes a drive shaft, and a drive wheel assembly is connected to the drive shaft. The drive wheel assembly includes a center-driven wheel connected to the drive shaft and an eccentric drive element located off-center on the center-driven wheel.

Moreover, because the handle-holder assembly and the oscillating driving assembly are spaced apart from each other by a predetermined distance, the fishing rod jigging apparatus of the invention is not prone to being tilted or flipped over by a fishing rod and reel whose handle is retained in the handle-holder assembly.

The linkage assembly includes a link pivotally connected at a first end to the eccentric drive element, and a link receiver is connected to the handle-holder assembly. The link is also pivotally connected to the link receiver. The handle-holder assembly includes a canted end adapted to permit the handle-holder assembly to be oriented at a canted angle with respect to the base assembly. The handle-holder assembly includes a hollow cylindrical chamber adapted to receive a handle of a fishing rod.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fishing rod jigging apparatus which has all of the advantages of the prior art and none of the disadvantages.

It is another object of the present invention to provide a new and improved fishing rod jigging apparatus which may be easily and efficiently manufactured and marketed.

It is a further object of the present invention to provide a new and improved fishing rod jigging apparatus which is of durable and reliable construction.

An even further object of the present invention is to provide a new and improved fishing rod jigging apparatus which is susceptible of a low cost of manufacture with regard to both materials and labor, and which accordingly is then susceptible of low prices of sale to the consuming public, thereby making such fishing rod jigging apparatus available to the buying public.

Still yet a further object of the present invention is to provide a new and improved fishing rod jigging apparatus which has a relatively low center of gravity.

Still another object of the present invention is to provide a new and improved fishing rod jigging apparatus that permits the use of a conventional fishing rod and reel.

Yet another object of the present invention is to provide a new and improved fishing rod jigging apparatus which does not include complex electronic circuitry.

Even another object of the present invention is to provide a new and improved fishing rod jigging apparatus that does not include springs for providing a jigging motion.

Still a further object of the present invention is to provide a new and improved fishing rod jigging apparatus which does not include cams for imparting a jigging motion.

Yet another object of the present invention is to provide a new and improved fishing rod jigging apparatus that arrays major components of a fishing rod jigging apparatus on a base in such a way that a relatively low center of gravity is obtained.

Still another object of the present invention is to provide a new and improved fishing rod jigging apparatus which permits a conventional fishing rod and reel to be readily removed from and placed in the apparatus.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the fishing rod jigging apparatus of the invention with a conventional fishing rod and reel shown in three positions during a jigging motion.

FIG. 2 is an enlarged perspective view of the embodiment of the fishing rod jigging apparatus shown in FIG. 1 with the fishing rod and reel removed.

FIG. 3 is a cross-sectional view of the embodiment of the fishing rod jigging apparatus of FIG. 2 taken along line 3—3 thereof.

FIG. 4 is an enlarged partial cross-sectional view of the embodiment of the invention shown in FIG. 3 taken along line 4—4 thereof.

DESCRIPTION OF THE PREFERRED EMBODIMENT

With reference to the drawings, a new and improved fishing rod jigging apparatus embodying the principles and concepts of the present invention will be described.

Figure 5:
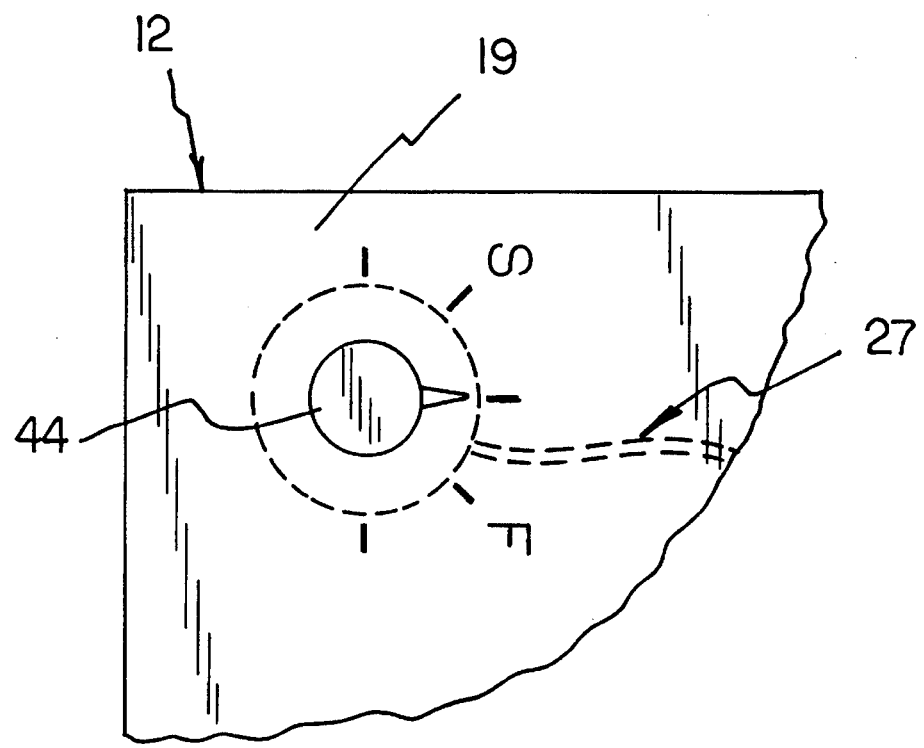
FIG. 5 is an enlarged partial top view of the embodiment of the invention shown in FIG. 3 taken along line 5—5 thereof.
Figure 6:
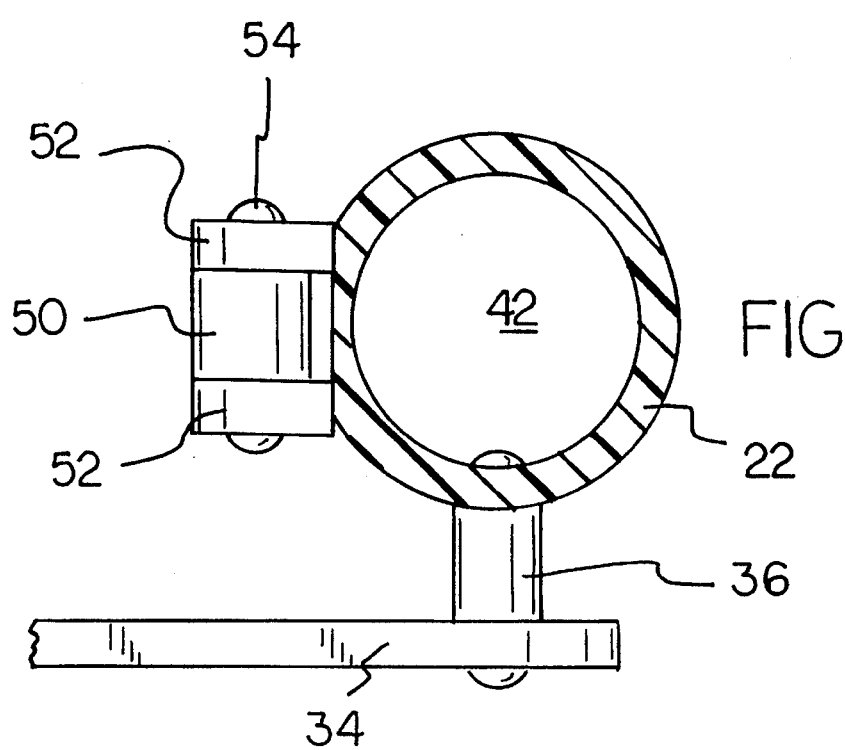
FIG. 6 is an enlarged cross-sectional view of the embodiment of the invention shown in FIG. 3 taken along line 6—6 thereof.

Turning to FIGS. 1–6, there is shown an exemplary embodiment of the fishing rod jigging apparatus of the invention generally designated by reference numeral 10. In its preferred form, fishing rod jigging apparatus 10 includes a base assembly 12 which has a longitudinal axis 14 and has a length 13, a width 15, and a height 17, wherein each of the length 13 and the width 15 is substantially larger than the height 17, such that the base assembly 12 is adapted to be stably oriented on a horizontal surface. An oscillating driving assembly 16 is supported on a top surface 19 of the base assembly 12 at a first position along the longitudinal axis 14. A hinge assembly 20 is supported on the top surface 19 of the base assembly 12 at a second position along the longitudinal axis 14. The hinge assembly 20 is spaced apart by a predetermined distance from the oscillating driving assembly 16. A handle-holder assembly 22 is connected to the hinge assembly 20. The handle-holder assembly 22 is adapted for rotational motion around the hinge assembly 20 limited in a bottom direction by the base assembly 12. A linkage assembly 24 is connected between the oscillating driving assembly 16 and the handle-holder assembly 22 for imparting an oscillating motion to the handle-holder assembly 22. The hinge assembly 20 includes a first portion 50 rigidly fixed to the base assembly 12. A pair of lips 52 are connected to the handle-holder assembly 22, and a pivot pin 54 is placed through an aperture in the first portion 50 and through apertures in the pair of lips 52 which are placed in registration.

The oscillating driving assembly 16 includes a battery 26 supported by the base assembly 12 at the first position along the longitudinal axis 14. A motor assembly 18 is electrically connected to the battery 26 and supported on the base assembly 12 at a third position along the longitudinal axis 14 between the first and second positions along the longitudinal axis 14. The motor assembly 18 includes a drive shaft 19, and a drive wheel assembly 28 is connected to the drive shaft 19. The drive wheel assembly 28 includes a center-driven wheel 30 connected to the drive shaft 19 and an eccentric drive element 32 located off-center on the center-driven wheel 30. When the drive shaft 19 rotates, the center-driven wheel 30 rotates with the drive shaft 19, and the eccentric drive element 32 oscillates. The oscillation of the eccentric drive element 32 is transferred through the linkage assembly 24 to the handle-holder assembly 22 to impart an oscillating motion to the handle-holder assembly 22.

The base assembly 12 is relatively long and weighty, and the weighty elements that are placed on top of the base assembly 12, such as the battery 26 and the motor assembly 18, are of a relatively low height. Therefore, the fishing rod jigging apparatus 10 of the invention has a relatively low center of gravity. The base assembly 12 can be made of any suitable weighty material such as metal of slate as examples. Moreover, because the handle-holder assembly 22 and the oscillating driving assembly 16 are spaced apart from each other by a predetermined distance, the fishing rod jigging apparatus 10 of the invention is not prone to being tilted or flipped over by a fishing rod and reel whose handle 40 is retained in the handle-holder assembly 22.

The linkage assembly 24 includes a link 34 pivotally connected by an aperture at a first end to the eccentric drive element 32, and a link receiver 36 is connected to the handle-holder assembly 22. The link 34 is also pivotally connected by another aperture to the link receiver 36. More specifically, as the eccentric drive element 32 revolves around the rotating drive shaft 19, the first end of the link 34, which is pivotally connected to the eccentric drive element 32, moves in a cyclic circular pattern. The mid-portion of the link 34 transmits an oscillating motion to the handle-holder assembly 22 through the pivotal connection to the link receiver 36. As the link 34 oscillates, the handle-holder assembly 22 rotates in a partially circular oscillating manner around the hinge assembly 20. The hinge assembly 20 serves as the center of the circular arc around which the handle-holder assembly 22 oscillates. The handle-holder assembly 22 includes a canted end 38 adapted to permit the handle-holder assembly 22 to be oriented at a canted angle with respect to the base assembly 12. The handle-holder assembly 22 includes a hollow cylindrical chamber 42 adapted to receive a handle 40 of a fishing rod.

In use, a handle 40 of a fishing rod is inserted into the hollow cylindrical chamber 42 of the handle-holder assembly 22 before the oscillating driving assembly 16 is turned on. Once the oscillating driving assembly 16 is turned on, the fishing rod and reel is caused to oscillate in a circular arc motion around the hinge assembly 20 as shown by positions of the fishing rod and reel shown in FIG. 1. The canted end 38 of the handle-holder assembly 22 limits the orientation angle of the handle-holder assembly 22 with respect to the base assembly 12 to the canted angle. The oscillating circular arc motion of the fishing rod and reel causes any bait or lure on a fishing line 56 in a body of water to undergo a jiggling action. When a fish bites at the bait or lure at the end of the fishing line 56, the fisherman can readily remove the handle 40 of the fishing rod and reel from the handle-holder assembly 22 and manually control the fishing rod and reel.

A variable resistor 44 is supported by the base assembly 12, is connected in circuit by wires 27 between the battery 26 and the motor assembly 18, and is used for controlling the speed of the motor assembly 18. A common housing 46 is used to cover the battery 26 and the motor assembly 18.

The components of the fishing rod jigging apparatus of the invention can be made from inexpensive and durable metal, slate, or dense plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved fishing rod jigging apparatus that is low in cost, relatively simple in design and operation, and which has a relatively low center of gravity. With the invention, a fishing rod jigging apparatus is provided which permits the use of a conventional fishing rod and reel. With the invention, a fishing rod jigging apparatus is provided which does not include complex electronic circuitry. With the invention, a fishing rod jigging apparatus is provided which does not include springs for providing a jigging motion. With the invention, a fishing rod jigging apparatus is provided which does not include cams for imparting a jigging motion. With the invention, a fishing rod jigging apparatus is provided which arrays major components of a fishing rod jigging apparatus on a base in such a way that a relatively low center of gravity is obtained. With the invention, a fishing rod jigging apparatus is provided which permits a conventional fishing rod and reel to be readily removed from and placed in the apparatus.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A fishing rod jigging apparatus, comprising:

a base assembly having a longitudinal axis and having a length, a width, and a height, wherein each of said length and said width is substantially larger than said height, such that said base assembly is adapted to be stably oriented on a horizontal surface, an oscillating driving assembly supported on a top surface of said base assembly at a first position along said longitudinal axis, wherein said oscillating driving assembly includes a battery supported by said base assembly at said first position along said longitudinal axis, a hinge assembly supported on said top surface of said base assembly at a second position along said longitudinal axis, said hinge assembly being spaced apart by a predetermined distance from said oscillating driving assembly, a motor assembly electrically connected to said battery and supported on said base assembly at a third position along said longitudinal axis between said first and second positions along said longitudinal axis, said motor assembly including a drive shaft, and a drive wheel assembly connected to said drive shaft, said drive wheel assembly including a center-driven wheel connected to said drive shaft and an eccentric drive element located off-center on said center-driven wheel, a handle-holder assembly connected to said hinge assembly, said handle-holder assembly adapted for rotational motion around said hinge assembly limited in a bottom direction by said base assembly, wherein said handle-holder assembly includes a canted end adapted to permit said handle-holder assembly to be oriented at a canted angle with respect to said base assembly, and a linkage assembly connected between said oscillating driving assembly and said handle-holder assembly for imparting an oscillating motion to said handle-holder assembly, wherein said linkage assembly includes a single link pivotally connected at a first end to said eccentric drive element, and a link receiver connected to said handle-holder assembly, wherein said single link is pivotally connected to said link receiver.

2. The apparatus of claim 1 wherein said handle-holder assembly includes a hollow cylindrical chamber adapted to receive a handle of a fishing rod.

* * * * *